United States Patent [19]
Farmer

[11] 3,915,218  
[45] Oct. 28, 1975

[54] METHOD OF FABRICATING BATTERY ELEMENTS

[75] Inventor: John E. Farmer, Chicago, Ill.

[73] Assignee: Farmer Mold And Machine Works, Inc., Chicago, Ill.

[22] Filed: Nov. 5, 1973

[21] Appl. No.: 412,872

Related U.S. Application Data

[60] Division of Ser. No. 252,923, May 12, 1972, abandoned, which is a continuation-in-part of Ser. No. 8,107, Jan. 21, 1970, abandoned, which is a division of Ser. No. 650,063, June 29, 1967, abandoned.

[52] U.S. Cl. .............................. 164/102; 164/109  
[51] Int. Cl.² ........................................ B22D 19/00  
[58] Field of Search...... 164/98, 102, 109, 332–334; 136/134 R, 16

[56] References Cited  
UNITED STATES PATENTS

| | | | |
|---|---|---|---|
| 1,797,684 | 3/1931 | Handler | 164/109 |
| 1,800,422 | 4/1931 | Williams | 136/16 X |
| 3,087,005 | 4/1963 | Sabatino et al. | 164/109 X |
| 3,238,579 | 3/1966 | Sabatino et al. | 164/102 |

Primary Examiner—R. Spencer Annear

[57] ABSTRACT

The method of fabricating storage battery elements by the cast-on method including the provision of a battery plate having a lug with a reduced free end.

6 Claims, 10 Drawing Figures

METHOD OF FABRICATING BATTERY ELEMENTS

RELATED APPLICATIONS

This is a division of application Ser. No. 252,923, filed May 12, 1972, now abandoned, which in turn is a Continuation-in-Part of an application filed Jan 21, 1970, Ser. No. 8,107, entitled "Method of Fabricating Storage Battery Elements," now abandoned, which application was a division of application Ser. No. 650,063, filed June 29, 1967, and entitled "Battery Plate with Reduced Lug Structure and Method of Fabricating Battery Elements", now abandoned.

1. BACKGROUND OF THE INVENTION

Field of the Invention

This invention relates to improvements in the method of fabricating elements of a storage battery and more particularly to an improved battery plate lug construction as well as the method of fabricating battery elements utilizing a plate having a particular lug construction.

2. Description of the Prior Art

Until recently, the common method of assembling posts, straps and plates of a storage battery has been by the so-called "burning" process. Simply stated, this meant that the strap and post were cast separately and then welded to the lugs on the plates. Recently, the so-called "cast-on" method has come into use. By this method, the lugs of the battery plates are dipped into a mold containing molten lead so that the straps and posts are formed on the lugs when the plates are withdrawn and the molten lead is cooled. One of the problems which has arisen in the cast-on method is that of obtaining a good bond or high degree of fusion between the lugs of the battery plates and the cast post and strap. This problem has been dealt with in Sabatino et al., U.S. Pat. No. 3,087,005; Sabatino et al U.S. Pat. No. 3,229,339; Sabatino, et al U.S. Pat. No. 3,238,579; Bronstert, U.S. Pat. No. 3,072,984; Fiegel, U.S. Pat. No. 3,395,748, and Handler, U.S. Pat. No. 1,797,684.

The solution presented in the Sabatino U.S. Pat. No. 3,087,005 is to separately heat the lugs of the battery plates prior to immersing the same into the mold for forming the strap and post portion of the battery. An alternative suggested in this patent is to position the lugs in the mold cavities prior to pouring any molten lead into the cavities. The first solution, separate heating, requires an additional step in the process and additional equipment. The second solution, placement of the lugs in the mold cavities prior to pouring the lead, often times results in the lugs being burned off the plates when the hot lead is introduced to the cavities.

Sabatino, U.S. Pat. No. 3,229,339 proposes as a solution to the problem, the use of a specific flux at the fluxing station. In particular, the flux is heated to certain temperatures, suggested to be between 180° and 600° F. This places a limitation on the types of flux which can be used and requires structure for heating the flux.

Sabatino U.S. Pat. No. 3,238,579 suggests the use of flux in certain solvents having a specific boiling point and then allowing a specific time for evaporation. This limits the range of usable fluxes and solvents and also requires means for heating the flux and solvent.

The solution suggested in Bronstert, U.S. Pat. No. 3,072,984 is to specifically control the immersion of the lugs into the molten lead from a rapid initial immersion to a progressively slowed subsequent immersion. This requires sophisticated mechanism to control the rate of descent and creates problems in timing.

The Handler patent discloses a concept of casting a battery strap and post onto a plate lug and, in one form of the disclosure, shows a plate lug 2' which, according to the disclosure, has an "inclined lower face 19'." However, the teaching of the Handler patent is to first insert the lug into the mold cavity and then pour molten lead into the cavity. The concept is to maintain the surface of the lug away from the molten lead until the lead has been poured in a sufficient quantity to form a pool that will form the battery post. As the level of the molten lead rises, it would heat the lug and finally arrive at a point where it approaches the free end of the lug and begin to come in contact therewith. Handler's system has been found to be unworkable and most of the known art, relating to the cast-on method, including the patents referred to here above, propose the pouring of the lead into the mold first, followed by immersion of the lugs.

The Tiegel U.S. Pat. No. 3,395,748 shows a conventional battery lug construction having the common "square" end and teaches the practicing of the cast on method of battery fabrication by first pouring the lead into the mold cavity and then immersing the lug therein, as has been found to be the better sequence. Tiegel teaches that the optimum bond can only be obtained by maintaining the mold, as well as the lead, at an extremely high temperature. The specific temperatures mentioned by Tiegel are in the range of 650° F. to 900° F. This further necessitates that the fabricating machine be provided with a heat exchange means to rapidly chill the mold in order to solidify the molten lead as soon as the optimum bond has been obtained and, of course, to maintain the output of the fabricating machine at a relatively high number per unit of time.

With respect to the structure of battery lugs, typically battery plates are generally of the construction shown in Sabatino et al, U.S. Pat. No. 3,253,306 or in Sabatino, U.S. Pat. No. 3,249,981. As shown in those patents, the lug is relatively wide in comparison to the border of the plate. The increased width assists in promoting strength in the fusion bond between the lug and the strap. Typically the lug has a square free end. Sometimes, the face to face thickness of the lug is slightly reduced with relationship to the rest of the plate in order to save upon the amount of lead that is used in making the plates.

Other examples of battery lug construction are found in the Salmon et al, U.S. Pat. No. 1,982,485, Galloway U.S. Pat. No. 2,502,373, and Williams U.S. Pat. No. 1,918,947. Patents issued to the inventor hereof and assigned to the assignee of this invention relating to mechanisms for fabricating battery elements include U.S. Pat. Nos. 3,504,731, 3,565,162 and 3,604,094.

SUMMARY OF THE INVENTION

This invention is directed, in brief, to the provision of a plate for use in a lead acid storage battery having a lug of a reduced dimension on the free end. Preferably the reduction is in the form of a tapered end. Furthermore, this invention is directed, in brief, to the method of making battery elements by the cast-on method by providing battery plates having lugs with reduced or tapered ends.

DESCRIPTION OF THE PREFERRED EMBODIMENT

Figure 1:
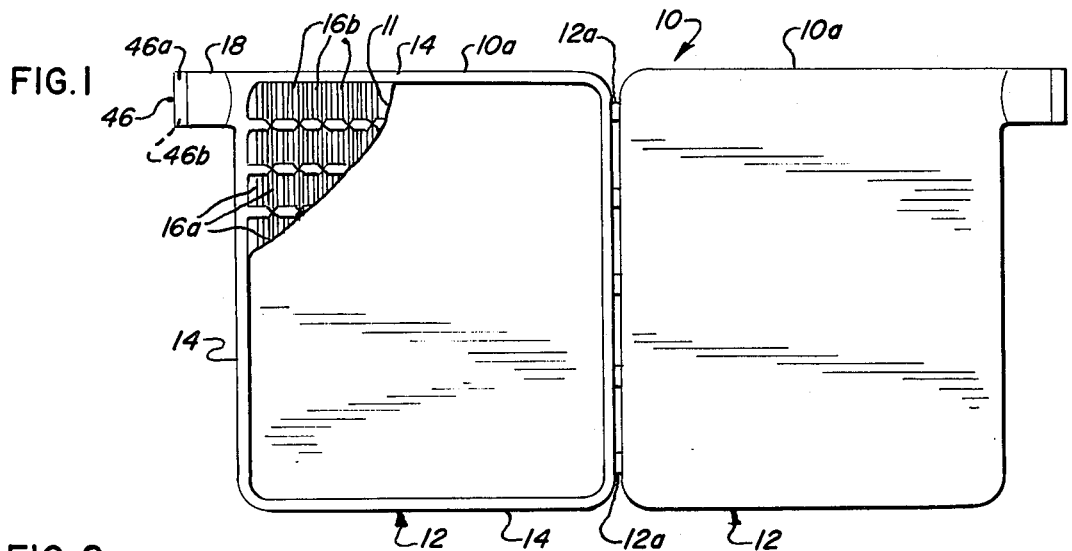
FIG. 1 is a plan view of a pair of battery plates each having the preferred form of lug of the present invention, the plates being arranged in back-to-back relationship and formed in accordance with conventional methods of manufacture, and a portion of one plate being broken away to show a grid casting.

In FIG. 1 there is shown a pair of battery plates, generally designated 10, which are joined in a back-to-back relationship by small gates or feet portion 12a. Each plate comprises a grid 10 upon which a lead oxide paste 11 is spread. Each plate is then subsequently "charged" or "formed" so as to provide either a negative or a positive plate for a storage battery. The plates can be separated into individual elements prior to forming by breaking along the feet or gates 12a.

Figures 8, 9:
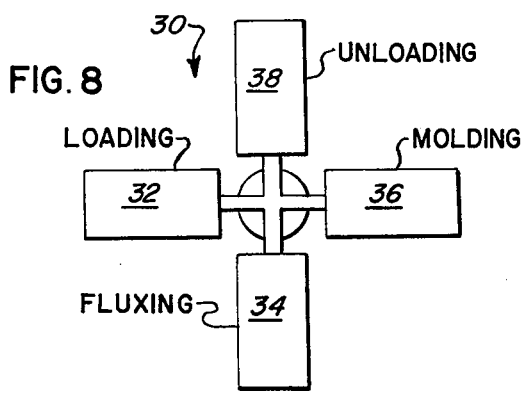
FIG. 8 is a diagrammatic view of a mechanism for carrying out the cast-on method of molding battery straps and posts to the lugs of battery plates.
FIG. 9 is a top plan view of an assembled group or battery plates and separators.

Typically battery grid castings include a border 14 around each side of the casting and interlaced, horizontal and vertical cross bars 16a and 16b forming a grid-like construction. In addition, a lug 18 projects upwardly from the top of the plate along one edge thereof. When assembled, as shown in FIG. 9 and in an inverted or downwardly projecting position in FIG. 2, a group 20 of the plates comprises a plurality of individual plates 10a, which may be alternately arranged with respect to the side to which the lugs 18 are disposed, separated by separator members 22. A strap 24 is fused to the lugs 18 on each side of the group, and a post 26 projects outwardly from the strap.

As previously mentioned, until recently the common method for assembling the plates in such a manner was by the so-called "burning" method wherein the strap and post were welded together and welded onto the lugs. Recently, however, the cast-on method of forming the strap and post on the lug has come into use. In one form of carrying out this method, as diagrammatically illustrated in FIG. 8, the plates may be first loaded at a loading station 32, the lugs prepared at a preparation station 34, and then the plates sent to a molding or casting station 36 wherein the lugs are dipped into a cavity containing molten lead with the result that the straps 24 and posts 26 are cast onto the lugs 18. From the molding station 36, the lugs are sent to an unloading station 38. The structure diagrammatically shown in FIG. 8 is disclosed and fully described in my U.S. Pat. Nos. 3,504,731; 3,565,162; and 3,604,094.

Figure 2:
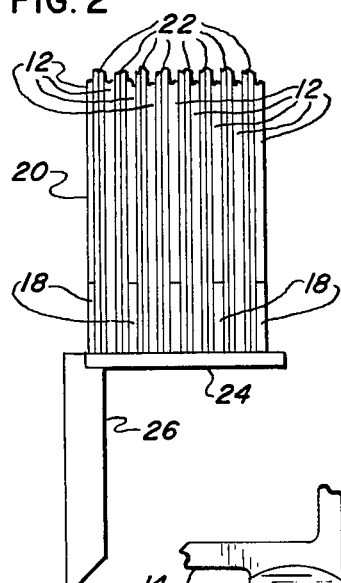
FIG. 2 is an inverted fragmentary side elevational view of a group of negative and positive battery plates separated by separators with the plates joined by a strap fused across the lugs and the strap having an outwardly projecting post.
Figures 3, 3A:
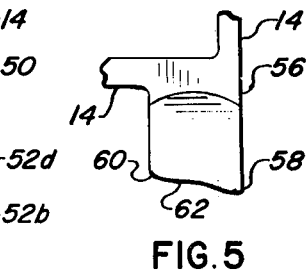
FIG. 3 is a fragmentary sectional view of the lug portion of a battery plate prior to entry of the lug into a mold having molten lead in a cavity to form a strap across the lug by the cast-on method of manufacture.
FIG. 3A is a section view taken generally along the line 3A—3A of FIG. 3.

As illustrated in FIG. 3, the mold member 40 at the molding station includes a mold cavity 42 into which molten lead 44 is fed. The lugs 18 are dipped into the cavity, following which the molten lead cools rapidly and forms the strap 24 and post 26 structure fused to the lugs 18 generally as shown in FIG. 2. The resultant battery groups are then withdrawn from the mold.

In the preferred embodiment of this invention, the lug 18 is provided with a tapered or pointed end 46 with pairs of mutually converging inclined face portions 46a and 46b. Such a structure provides a lug of progressively reduced volume in a direction toward the exposed or free end of the lug. This factor, coupled with substantially instantaneous immersion of the lug tip after molten lead is poured, provides maximum utilization of the heat from the molten lead so that a good lug connection is obtained even though the immersed lugs are at ambient temperatures.

As previously mentioned, heretofore in the art of cast-on molding of straps and posts, the problem of the lead oxide barrier on the end of the lug has resulted in several proposed solutions for obtaining good fusion as manifested by the aforementioned prior art patents. It has been found that with the use of a lug having a reduced free end, such as a tapered lug 46, there is no need to apply special fluxes or solvents, to control the immersion rate of the lug, or to preheat the lug prior to inserting the same into the molten lead. It has been found that the tapered lug may be dipped into the molten lead with the lugs at ambient temperatures, the mold maintained at a constant, relatively low temperature, such as around 300° F., and good fusion between the cast straps and lugs will be obtained without going through any of the special steps suggested by the art.

Other forms of lug construction are shown in FIGS. 4 through 7. The lug 50 shown in FIG. 4 has an inverted V-shaped end 52 with outwardly diverging walls 52a and 52b terminating in outwardly facing, laterally spaced tips or pointed ends 52c and 52d. When the molten lead enters the mold cavity 42, it cools most rapidly in the area adjacent the walls 42a and 42b of the mold while remaining hot longer in the center of the mold. By inserting the tips 52c and 52d of the lug in the coolest portion of the mold (adjacent walls 42a and 42b), at the earliest point of the cycle, the breakdown of the lead oxide sheath on the lugs will be effectuated at the optimum time or prior to the loss of a substantial amount of heat by the molten lead 44 in the area of the walls of the cavity. Then as the lug continues its immersion into the molten lead, the portion which retains high temperature for the longest period of time (the center of the pool of lead) will contact the largest surface area on the free end of the lug. Heat transfer within the lead of the lug also occurs to dissolve the lead oxide shield, as pointed out in relation to the preferred embodiment of FIG. 3.

Figures 4, 5, 6, 7:
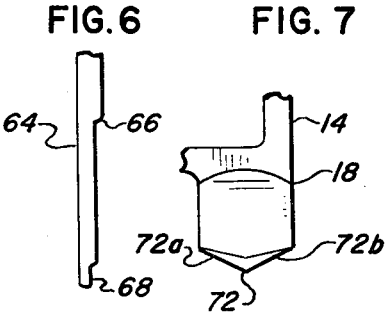
FIG. 4 is a fragmentary front elevational view of a modified form of the lug construction of this invention.
FIG. 5 is a fragmentary front elevational view of another modified form of the lug construction of this invention.
FIG. 6 is a fragmentary view in side elevation of a further modified form of the lug construction of this invention.
FIG. 7 is a fragmentary side elevational view of another modified form of the lug construction of this invention.

In FIG. 5, a lug 56 is shown which has one side 58 projecting beyond the other side 60 with a generally beveled end face 62 running between the sides 58 and 60. As previously mentioned, the lead will cool in the area adjacent the side walls of the mold, due to the fact that the mold 40 itself takes heat away from the lead. In addition, the lead will cool in the area where it is first fed into the mold cavity 42. Thus, if the molten lead first is fed against wall 42a and last fills to the opposite wall 42b, the immediate immersion of lug 56 so that the end 58 is adjacent wall 42a provides efficient heat transfer and breaks down the lead oxide of the lug tip even though the lug initially contacts the molten lead in the location where the lead cools fastest in the mold.

FIGS. 6 and 7 show further modifications of this invention wherein the free end of the lug is reduced in dimension between its faces to reduce the initial volume of the lug that is exposed to the molten lead. For example, the lug 64 shown in FIG. 6 has a first reduced portion 66 and a second reduced portion 68 at the free end of the lug which reduces the quantity of lead of the lug, and the amount of lead oxide surface area that is presented to the molten lead. Both of these structural features or factors reduce the amount of heat which is taken out of the molten lead and establishes a more efficient heat transfer in melting the lead in the lugs and fusing the same with the molten lead cast into the mold cavity 42. In FIG. 7, the lug 70 has a tapered or pointed end 72 with pairs of mutually converging inclined leading edge portions 72a and 72b. Such a lug construction provides a lug of progressively reduced volume in a cross-sectional and lateral dimension.

It is believed that one general reason that such a good bond is obtained is that when the lug initially contacts the hot lead, only the oxide on the small area of the tip 46 must be broken down by the molten lead, minimizing the amount of heat taken from the molten lead to accomplish this purpose. Once the initial oxide barrier is broken down at this small point, heat transfer occurs rapidly in the lead within the lead oxide shield which sheaths the lug, and the lead oxide shield is dissolved from heat within the lug lead as well as the heat from the molten lead in the mold. The lead is thus melted more rapidly as it is progressively immersed than is the lead in the lugs with square free ends of the prior art. As a result, the entire free end of each of the lugs is melted by the molten lead and fuses therewith. Heretofore, when forming straps and posts of the lugs of battery plates by the cast-on method, lugs with the typical square free end configuration under ambient temperatures and low mold temperature would not bond or fuse with sufficient consistency with the lead which forms the strap. Hence special additional measures were undertaken in an attempt to obtain satisfactory bonding.

The prior preparation of the lugs before casting can be a significant factor in obtaining a good bond. This preparation may typically include the cleaning of the lugs, such as by mechanical or chemical means. Also, as previously stated, in some of the prior art patents, pre-heating the lugs has been another form of preparing the lugs for good bonding.

One of the currently popular means of preparing the lugs before casting is by mechanically abrading the lugs through the provision of a rotatable wire brush or similar means. With particular preference to FIGS. 3 and 3A, the tapered lug construction shown therein is most ideally suited for prior cleansing by means of such abrasion. Typically, such wire brushes are in the form of a rotating spindle which may traverse laterally across the lug, such as from right to left and back again, with respect to the lug shown in FIG. 3. In so doing, the axis of rotation of the brush is about a line which is perpendicular to the faces of the lug 18. Thus, the bristles of the brush wipe across the faces of the lug and, with reference to FIG. 3A, the bristles tend to uniformly engage the "climb" the inclined end portions 46a and 46b to provide an excellent brushing action. In the case of lugs which have the conventional squared end, it is believed that the bristles do not uniformly clean the end portion of the lugs and that they are diverted outwardly and therefore do not completely come in contact with the end portion of the lug, as opposed to the structure as shown in FIG. 3A where the diverging or converging end configuration tends to equate that of the flare of the bristles of the brush as the brush is subjected to its abrading motion with respect to the lug.

As mentioned in the Tiegel patent, typically the temperature of lead which is introduced into the casting station may be as high as 900° F. However, with respect to the mechanisms diagrammatically illustrated in FIG. 8, and as disclosed in my aforesaid mentioned U.S. Pat. Nos. 3,504,731, 3,565,162 and 3,604,094, it is desired to maintain the temperatures of the mold relatively low, such as around 300° F., or generally between approximately 250° and 400° F. In the disclosures of my aforementioned patents the temperature 375° F. is given as an illustrative example. Presently, it is felt that a lower temperature such as about 300° F. is more desirable. The potential problem is maintaining the mold at such a relatively cool temperature, as confronted by Tiegel, is that basically speaking, the cooler the lug the poorer the bond between the lug and the cast strap. The advantage of a cool mold is that neither time nor equipment need be provided for chilling the fused lug and strap or adjacent mold portions as is required by Tiegel. Because Tiegel maintains the mold at such a high temperature, the lead is molten for a longer period of time, which tends to cause more oxides to form in the lead. Another shortcoming of the method Tiegel is that the combination of inducing extremely high temperatures into the mold followed by rapid chilling of the fused lug and strap tends to cause crystallization of the metal. Crystallization is generally intolerable in metal and particularly so in battery elements in that elements may fracture in response to slight vibration. With the lug construction of this invention, involving reduced volume at the end thereof, heat is drawn into the lug more quickly, resulting in a good bond with the relatively cold lug, therefore minimizing if not eliminating the need for either pre-heating the lugs or maintaining the temperature at the casting station mold to a high degree.

Another factor involved in maintaining a good bond and relating to the temperature maintained at the casting station is the relationship of the lug volume to the volume of the pool of molten metal at the cavity. As this relationship becomes closer to one, the amount of heat drawn by the lug or required to be drawn by the lug from the pool is increased. The use of a tapered lug cuts down the relation of lug volume to pool capacity. Also, as best illustrated in FIG. 3A, the lug does not have to pierce deeply into the pool of molten metal in the cavity. As shown in FIG. 3A, the molten metal tends to be drawn up the tapered end of the lug in much the same way as the action of the miniscus of any fluid relative to an article introduced therein. This means that a smaller volume of the lug is introduced into the pool, therefore drawing less heat from the pool and yet maintaining a good bond, by reason of both the miniscus action of the molten lead pool and the reduction of oxides formed in the molten lead in that the molten lead may cool more rapidly owing to the ambient temperatures in the mold cavity which, preferably is maintained at a constant temperature of 300° F. or so, well below the general 900° F. temperature of the molten lead which is introduced into the cavity.

For years the common lead alloy utilized in battery plates has been a lead antimony alloy. Recently, calcium lead alloy has come into use for making battery plates. The advantage of the calcium alloy is that it does not give off gases during charging which would reduce the fluid level of the battery. However, the calcium alloy oxidizes very rapidly and forms a scum very quickly in a molten pool. Thus, again, the timing involved and the reduction of the amount of time required for obtaining a bond between the lug and cast strap is most important, particularly with such calcium alloys. As aforementioned, the reduced volume of the tapered lug requires less heat draw, requires lower mold temperatures so that the entire fusion can be accomplished over a shorter period of time. In addition, when the mold is maintained at a lower temperature, there is less tendency for oxidation to form in the molten lead particularly in lead calcium alloys. Another feature of the tapered lug construction is that it quickly and evenly pierces the immediately forming oxide coating or scum and surface tension in the calcium lead molten pool. The bond can be quickly formed with the lead cooling rapidly, forming a good bond with a minimum of deleterious oxides produced.

A further advantage of the tapered lug relates to alignment of the plates. Sometimes the plates are stacked with the bottom of the plates bearing downwardly on the feet or gate portions along which the plates are separated from the original casting. It is possible that some plates will be slightly higher than other plates due to the minor differences in the area along which the plates are broken from the casting. With the lugs having a generally rectangular end configuration, a minor variation in the height thereof can be critical in the molding process when the lug is dipped into the molten lead. It is contemplated that in using a tapered end configuration the lugs may be made slightly longer than normal for the square end lugs which will not increase the amount of lead used in forming the lugs but will increase the extent to which the free end of the lug protrudes outwardly from the plate to accommodate the minor differences in plate height due to the uneven feet portions.

It is to be understood that wherever the term "tapered" is utilized herein to describe the lug configuration, this term is intended to generally apply to all forms disclosed herein or reasonable equivalents thereof, unless otherwise indicated.

The foregoing detailed description has been given for clearness of understanding only, and no unnecessary limitations should be understood therefrom, as some modifications may be obvious to those skilled in the art.

I claim:

1. The method of fusing a battery post strap to a battery plate, consisting essentially of the steps of: providing a casting station having a mold cavity; providing a battery plate having a lug with a tapered free end; applying flux to the lug delivering molten metal to the mold cavity; and inserting the lug into a mold cavity after the molten metal is supplied thereto, the reduced free end of the lug presenting a reduced surface area relative to the remainder of the lug which may be quickly reduced by molten lead previously fed into the mold cavity.

2. The method of using a battery post strap to a battery plate, consisting essentially of the steps of: providing a casting station having a mold maintained at an elevated temperature below the melting point of metal intended to be received therein; providing a battery plate having an integral flat lug with a free end having a longitudinally tapered end edge; delivering molten metal to the cavity; and inserting the lug into the cavity after the molten metal is delivered thereto by piercing the molten metal surface without chilling the molten metal to form a miniscus of molten mold cavity metal on the lug at the surface the tapered and pointed free end of the lug presenting a substantially reduced surface area relative to the plate and relative to the remainder of the lug for bonding with the molten lead previously fed into the mold cavity.

3. The method of claim 2 wherein the outwardly projecting taper of the lug of the provided plate includes two laterally separated tapered surfaces.

4. The method of claim 2 wherein the outwardly projecting taper of the lug of the provided plate is in the form of a generally outwardly facing U-shaped configuration.

5. A method of fusing a battery post strap to a battery plate consisting essentially of the steps of: providing a casting station having a mold cavity while maintaining the temperature of the casting station adjacent the mold cavity approximately between 250°F. and 400°F. introducing molten lead into the casting station at a temperature in excess of 400°F.; providing a battery plate having an integral flat projecting lug with a tapered and pointed free end; inserting the lug into the mold cavity after the molten metal has been supplied thereto; by piercing the molten metal surface without chilling the molten mold metal to form a miniscus of molten mold cavity metal on the lug at the surface the tapered and pointed free end of the lug presenting a substantially reduced surface area relative to the plate and relative to the remainder of the lug for bonding with the molten lead previously fed into the mold cavity.

6. The method of claim 2 wherein the provided plate has a lug wherein the leading edge of the lug tapers rearwardly from the side of the lug which is an extension of one side of the plate, to the opposite side of the lug.

* * * * *

UNITED STATES PATENT OFFICE
CERTIFICATE OF CORRECTION

PATENT NO. : 3,915,218
DATED : October 28, 1975
INVENTOR(S) : John E. Farmer

It is certified that error appears in the above-identified patent and that said Letters Patent are hereby corrected as shown below:

Column 1, line 40 "Fiegel" should be --Tiegel--

Column 3, line 34 "or" should be --of--

Column 6, line 9 "gage the" should be --gage and--

Signed and Sealed this twenty-fourth Day of February 1976

[SEAL]

Attest:

RUTH C. MASON
Attesting Officer

C. MARSHALL DANN
Commissioner of Patents and Trademarks